April 9, 1957

S. A. JOHNSON 2,788,447

RADIO WAVE TUNERS

Filed Sept. 12, 1952

INVENTOR
STANLEY A. JOHNSON

BY Ralph B. Stewart
ATTORNEY 2,788,447

RADIO WAVE TUNERS

Stanley A. Johnson, New York, N. Y., assignor to Polytechnic Research & Development Co., Inc., Brooklyn, N. Y., a corporation of New York Application September 12, 1952, Serial No. 309,184
7 Claims. (Cl. 250—36)

This invention relates to an oscillator for producing electric oscillations which vary in frequency periodically about a mean value.

An object of the invention is to devise an oscillation generator which may be adjusted in means frequency throughout a given frequency range and to provide periodically operated means for the cyclic variation of the frequency above and below the mean frequency value throughout said range.

A specific object of the invention is to devise a frequency-modulated oscillation generator in which the frequency deviation from said mean frequency is maintained substantially constant throughout said tuning range. A further object is to vary the amount of frequency deviation without changing the mean frequency.

Still another object is to devise means for varying the frequency of the oscillation generator sinusoidally about the mean frequency value.

The objects of my invention are attained by use of a periodically variable condenser connected in the frequency determining circuit of the oscillator. The modulating condenser involves two plates, or two sets of plates, arranged to be moved into overlapping relation, one of said plates is mounted for continuous cyclic movement relative to the other plate to produce a cyclic variation in the capacitance of the modulating condenser, and means is provided for moving one of the plates in a direction to vary the mean value of the capacity between the two plates, or between the two sets of plates. Provision is also made in some cases for adjusting or varying the amplitude of the cyclic variation of capacitance without changing the mean capacity value.

The invention is illustrated in the accompanying drawing in which

Figures 1, 2, 3, 4:
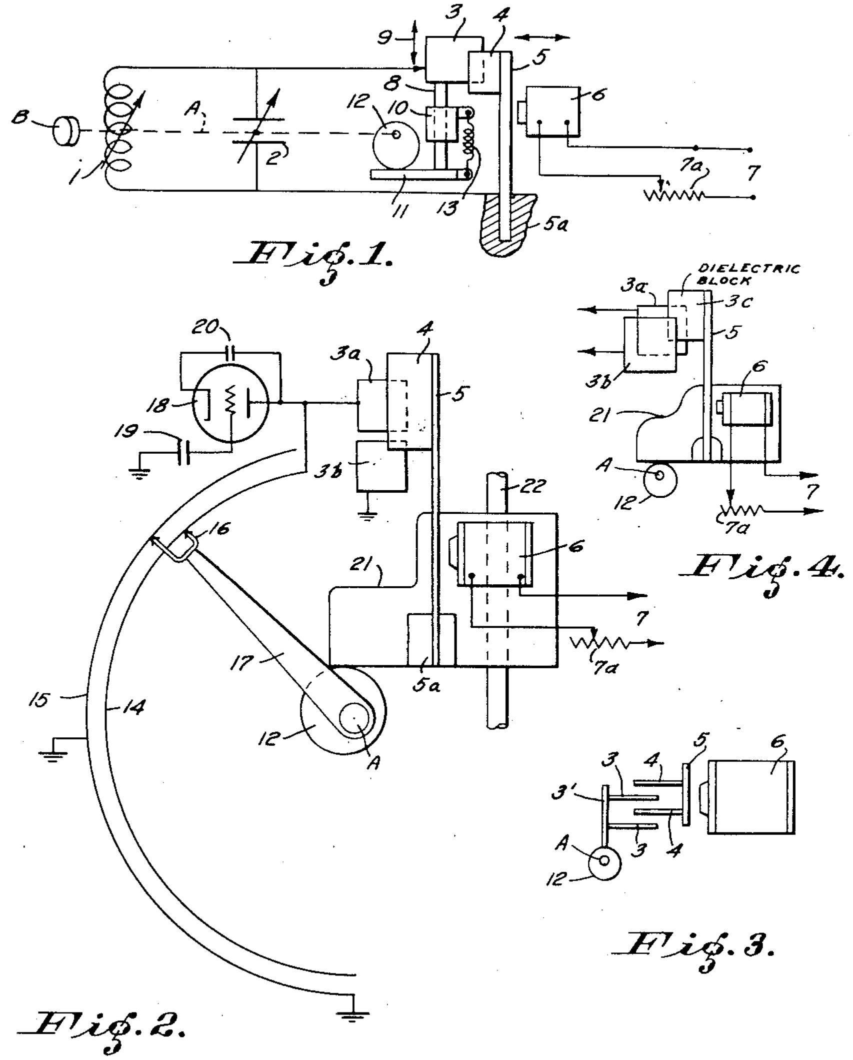
Figure 1 is a diagrammatic representation of the invention as applied to an oscillatory circuit formed of lumped reactance elements.
Fig. 2 is a diagrammatic showing of a preferred form of the invention in which the oscillatory circuit is formed of a resonant transmission line of variable length, and also showing a modified form of modulating condenser.
Fig. 3 shows another possible form of the modulating condenser.
Fig. 4 shows a fourth form.

Referring to Fig. 1, a tuned oscillatory circuit is formed of an inductance 1 and a condenser 2 connected in parallel. The resonant frequency of the circuit may be varied by varying either inductance 1 or condenser 2, or by varying both of these elements simultaneously, and this may be accomplished in any well known manner as represented by a tuning shaft A having a control knob B.

For the purpose of modulating the frequency of the tuned circuit, a variable condenser is connected across the circuit and the value of this modulating condenser is varied periodically. In the example shown in Fig. 1 the modulating condenser is formed of two plates or sets of plates represented at 3 and 4, plate 3 being connected to one side of condenser 2 and plate 4 to the opposite side of this condenser. Plate 4 is mounted upon one end of a vibratory reed 5, the opposite end of which is held rigidly in suitable fixed mounting *5a*. The reed 5 is formed of resilient material and is capable of flexing movement in the plane of the paper so that the amount of overlap between plates 3 and 4 may be varied. The reed 5 and the plate 4 carried thereby is maintained in constant vibration by any suitable means such as an electromagnet 6 arranged adjacent the reed 5 and energized from source of alternating current circuit 7 of a suitable frequency such as 60 cycles per second. It will be understood that reed 5 is formed of magnetic material or carries a magnetic member which is influenced by the magnet 6. Instead of using alternating current, magnet 6 may be energized by pulsating current formed of rectified alternating current. Preferably the current for energizing magnet 6 has a frequency or periodicity equal to the natural period of vibration of the reed 5.

The continuous vibration of plate 4 with respect to plate 3 results in a sinusoidal variation of the capacity between the plates 3 and 4, it being understood that the plate 4 is vibrated by harmonic motion. The amount of frequency deviation of the tuned circuit produced by variation of the modulating condenser will depend upon the frequency at which the circuit is tuned at any given instant and also upon the minimum and maximum values of the capacity of the modulating condenser. The amount of frequency deviation may be varied without changing the average frequency by varying the amplitude of vibration of reed 5, and this may be accomplished by varying the amount of current supplied to magnet 6, as by varying the resistor *7a*.

For the purpose of maintaining substantially constant frequency deviation throughout the tuning range of the tuned circuit, I provide means for varying the mean value of the modulating condenser in accordance with the tuning of the circuit. One arrangement for this purpose is illustrated in Fig. 1 in which the condenser plate 3 is mounted upon an insulated rod 8 which is supported for sliding movement in the direction 9 by means of a suitable guide 10. On the end of the rod 8 is mounted an arm 11 which projects into the path of a cam 12 mounted on the tuning shaft A. A suitable spring 13 normally urges the plate 3 upwardly and maintains the arm 11 in contact with the cam 12.

As the tuning shaft A is rotated to vary the frequency of the tuned circuit, the cam 12, acting through the elements 11 and 8, moves the condenser plate 3 to vary the amount of overlap of the plates 3 and 4 in the direction 9. This varies the mean value of the capacity between the plates 3 and 4. As the amount of overlap increases, the mean capacity value increases, and so does the minimum and maximum values. The cam 12 is designed with a proper shape so that the amount of frequency deviation produced by the vibration of the condenser plate 4 is constant through the range of movement of the tuning shaft A. Cam 12 is shaped to decrease the mean capacity of the modulating condenser as the frequency of the tuned circuit increases.

In Fig. 2 I have shown another form of my invention in which the tuned circuit comprises a resonant transmission line of variable length, and a different form of modulating condenser is employed. The resonant transmission line is represented diagrammatically by the conductors 14 and 15 arranged in a circular arc and provided with a short-circuiting slider 16 for varying the length of the line and thereby varying the resonant frequency thereof. The slider 16 is mounted upon an arm 17 of insulating material carried by the tuning shaft A. In actual practice, the tuned line would comprise a section of coaxial cable in which the conductor 14 forms the inner conductor and the conductor 15 would be the outer or shell conductor surrounding the conductor 14 and being suitably grounded. The arm 17 would extend through a slot in the outer conductor. Such constructions are well known in the art.

One end of line conductor 14 is connected to the anode element of a suitable electron tube 18 having a cathode and a grid. The grid is connected to the ground through a condenser 19, and a condenser 20 is connected between the anode and cathode elements to form a well known type of oscillator circuit. The frequency of oscillation is controlled by shifting the slider 16 to vary the length of the tuned line. The highest frequency is obtained when the slider 16 is nearest the end of the line connected to the tube 18, and the frequency progressively decreases as the slider moves towards the other end of the line.

The modulating condenser employed in Fig. 2 is formed of two metallic plates *3a* and *3b* arranged in a common plane but insulated from each other. One of these plates is connected to the end of the line conductor 14 while the other is grounded and therefore connected to the other line conductor 15. The capacity between the plates *3a* and *3b* is varied by means of a third plate 4 mounted upon the vibrating reed 5 in the manner already described in connection with Fig. 1. Instead of mounting the plates *3a* and *3b* for movement to vary the mean capacity value of the modulating condenser, the plate 4 is mounted to be moved in a direction at right angles to the vibratory direction to vary the mean capacity value of the condenser. This is accomplished by mounting the reed 5 and magnet 6 upon a carriage 21 which is guided by rod 22 for vertical movement at right angles to the direction of the vibratory movement produced by magnet 6. The amount of vertical movement of the carriage 21 is controlled by the cam 12 to vary the mean capacity value of the modulating condenser. The condenser has a maximum value when the plate 4 is centered vertically with respect to the plates *3a* and *3b*. As in the case of Fig. 1, the cam 12 is shaped to decrease the mean capacity value of the modulating condenser as the frequency of the oscillator increases. Also, as in the case of Fig. 1, the amount of frequency deviation may be controlled by varying the amplitude of vibration of the plate 4 by adjusting the value of resistance of *7a*.

Fig. 3 illustrates another possible form of modulating condenser which may be used in either Fig. 1 or Fig. 2. Parts corresponding to similar parts in Fig. 1 are indicated by the same reference numerals. Fig. 3 is a view as seen from above the upper end of reed 5. In this arrangement the modulating condenser is formed of two spaced plates 3, 3. Instead of mounting the plates 3 for movement vertically to vary the mean capacity of the modulating condenser as in Fig. 1, these plates are mounted to move at right angles to their planes to vary the spacing between the plates 3 and 4, and thereby vary the mean capacity value of the condenser. As shown in Fig. 3, the cam 12 is arranged to shift the plates 3 at right angles to their planes and at right angles to the direction of vibratory movement of the plates 4. As in the other arrangements, where it is desired to maintain a substantially constant frequency deviation throughout the tuning range, cam 12 would be shaped to decrease the mean value of the modulating condenser as the oscillator frequency increases.

Another possible form of modulating condenser is illustrated in Fig. 4. This arrangement is substantially like Fig. 2 except that the fixed plates *3a* and *3b* are arranged in superposed parallel relation but spaced apart to receive between them a block of dielectric material *3c* mounted upon the vibrating reed 5. This block would have a high dielectric constant with respect to that of air. Vibration of the reed 5 and the resulting vibratory movement of the block *3c* within the space between the plates *3a* and *3b* causes periodic variation of the mean capacity value of the modulating condenser.

Movement of the carriage 21 in a vertical direction by the cam 12 to vary the amount of insertion of the block *3c* between the condenser plates produces a variation in the mean capacity value of the condenser. As in the other arrangements, the cam 12 would be shaped to produce the desired variation in the mean capacity value of the modulating condenser as the mean frequency of the oscillator is varied by operation of the tuning shaft A.

While it is preferred to vary the frequency of the oscillator according to the sine wave law, it is clear that other forms of variation may be obtained by proper design of the shape of the condenser plates and by proper spacing of the plates with respect to each other.

What I claim is:

1. In combination, an oscillatory circuit having tuning means for varying the resonant frequency of the circuit throughout a given tuning range, a modulating condenser connected to said circuit to change the frequency thereof, said condenser comprising two relatively movable members for varying the capacity of said condenser, means moving one of said members in continuous periodic movement to effect relative movement between said members and thereby to vary the capacity of said condenser periodically above and below a mean value, and means controlled by the operation of said tuning means for imparting a further relative movement between said members to decrease the mean capacity of said condenser with increase in the resonant frequency of said circuit.

2. A combination according to claim 1 and including means for varying the amplitude of said continuous periodic movement.

3. A combination according to claim 1 wherein said modulating condenser comprises two parallel overlapping plates of conducting material mounted in spaced relation, means mounting one of said plates for vibratory movement in its own plane and in a direction to vary the amount of overlap, and means mounting one of said plates for movement in its own plane but at right angles to the direction of said vibratory movement to vary the mean capacity value of said condenser.

4. A combination according to claim 1 wherein said modulating condenser comprises two plates of conducting material arranged in a common plane but insulated from each other, and a third plate, means mounting said third plate in parallel overlapping relation to said two plates, said mounting means including means supporting said third plate for vibratory movement in its own plane and in a direction to vary the amount of overlap between said third plate and said two plates, and means for moving said third plate in its own plane and in a direction at right angles to said vibratory movement.

5. A combination according to claim 1 wherein said modulating condenser comprises a pair of conducting plates supported in spaced insulated relation, and a movable member for varying the capacity between said pair of plates, means supporting said movable member for vibratory movement in a plane parallel with said pair of plates and in a direction to vary the capacity between said plates periodically above and below a mean value, and means for moving said movable member in a direction at right angles to said vibratory movement to vary the mean value of the capacity between said pair of plates.

6. A modulating condenser formed of two metallic plates supported in spaced insulated relation, a resilient reed having one end thereof rigidly supported, means for vibrating the free end of said reed transversely of the axis of said reed, means carried by the free end of said reed for varying the capacity value of said condenser by the vibratory movement of said reed, and means for producing relative movement between said reed and at least one of the plates of said condenser in a direction parallel to the axis of said reed for varying the mean capacity value of said condenser.

7. A condenser according to claim 6 and including means for varying the amplitude of vibration of the free end of said reed.

References Cited in the file of this patent

UNITED STATES PATENTS

| | | |
|---|---|---|
| 2,007,099 | Usselman | July 2, 1935 |
| 2,160,466 | Usselman | May 30, 1939 |

| | | |
|---|---|---|
| 2,165,483 | Huggens | July 11, 1939 |
| 2,279,151 | Wallace | Apr. 7, 1942 |
| 2,306,282 | Samuel | Dec. 22, 1942 |
| 2,361,657 | Schock | Oct. 31, 1944 |
| 2,381,940 | Wallace et al. | Aug. 14, 1945 |
| 2,463,417 | Overacker | Mar. 1, 1949 |
| 2,597,993 | Hetland | May 27, 1952 |